July 17, 1934.   C. E. WOODDELL   1,966,473
COATED ARTICLE
Filed Dec. 30, 1932
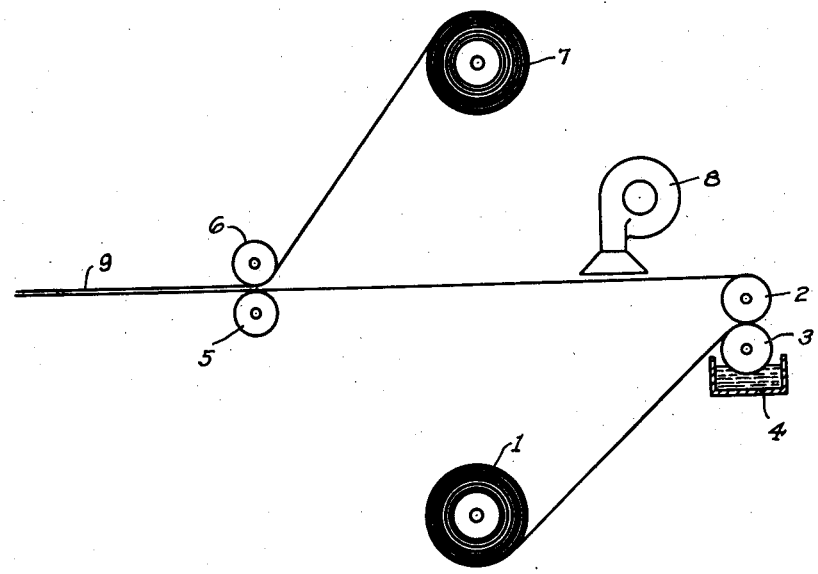
INVENTOR.
CHARLES E. WOODDELL
BY
ATTORNEY Patented July 17, 1934

1,966,473

UNITED STATES PATENT OFFICE 1,966,473

COATED ARTICLE

Charles E. Wooddell, Niagara Falls, N. Y., assignor to The Carborundum Company, Niagara Falls, N. Y., a corporation of Pennsylvania Application December 30, 1932, Serial No. 649,562

2 Claims. (Cl. 51—185)

This invention relates to granular coated webs, and to a new and improved method of making the same.

One of the objects of the present invention is the provision of a metal and granular coated web.

Another object of the invention is the provision of a new and improved method of coating the web with granules and superimposing thereon a metal coating wherein the process of applying the metal coating to the granular coated web is performed in a simple, efficient and economical manner.

Other and further objects and advantages of the invention will appear from the following description and drawing, wherein:

Fig. 1 is a diagrammatic elevational view of the apparatus for carrying out the invention.

In carrying out the process, as shown in the drawing, web 1 of paper, cloth or the like, having been first coated with granules such as silicon carbide, emery, etc., is passed between a pair of rollers 2 and 3. The latter roller 3 carries a thin film of cement, in the nature of a solution of a sulfonated rubber or rubber isomer, such as "Vulcalock", which will adhere to metals as well as to granules, from the receptacle 4 onto the granule coated face of the web 1. The granular coated web with the cement facing is passed beneath a blower 8, which emits a large volume of air at low velocity and partially dries the cement to the proper consistency, after which it goes to a pair of rollers 5 and 6 where the cement coated granules come in contact with a thin foil 7 of metal, such as brass, copper, aluminum, zinc and the like, which has been rolled to a uniform thickness. The web 1 and the foil 7, in intimate contact, are passed between the rollers 5 and 6, the roller 5 consisting of metal or similar hard material and comprising the supporting roller, while roller 6 is covered with a resilient material, such as rubber, felt or similar yieldable material, and comprising the pressing roller. As the web 1 and the foil 7 are passed between rollers 5 and 6 in close contact, roller 6 forces the metal foil 7 down over the granules, as well as around them, in a uniform manner, thus transforming the sharp granular surface into a modulated surface, with no sharp points protruding. The combined web 9 is further subjected to a second or third pair of pressing rollers, not shown, when coarse granules are used in order to secure the necessary intimate contact. The finished web is then taken to a drier where it is thoroughly dried.

The product thus produced presents a surface of metal which is continuous and not broken or disrupted, and it remains continuous during repeated use. Furthermore, it is uniform since the pressing rollers act consistently and uniformly upon all parts of the granular surface. The article of my invention is materially different from and a substantial improvement over abrasive sheets coated with metal by means of a spray inasmuch as a spray device deposits the metal upon the granular surface in the form of small globules which impart to the surface an irregular and granular form. Moreover, when a spray is used, the metal is forced down into the interstices between the granules, and numerous sharp edges of the granules are left uncovered, making the product less efficient for textile work, such as on drawing rolls, and also providing a surface which will retain the cuttings from the material being abraded which is particularly disadvantageous to the prolonged life of the product. Furthermore, since the action of the spray will be concentrated more or less upon one place of the granular surface, the metal coating will be devoid of the desired and advantageous uniformity which is inherent in the product produced by the method of this invention.

The use of a granular coated web having a superimposed surface of metal foil on the drawing rolls of weaving machines and the like results in securing the desired gripping action without cutting or pulling the fibres of the material held taut, which occurs when the surface is irregular and globular. Moreover, due to the dampness of the threads or fibres when being woven, the granules become detached and the web is quickly worn out. However, the use of a continuous metal coating upon the granular surface alleviates this difficulty since no water can penetrate the metal coating, nor are there any irregularities in the surface through which it can seep.

This improved type of granular coated web is also advantageously used in the fleshing of hides, since it has no sharp edges which will disrupt and tear the fibers and thus give to the surface of the leather a very rough finish as has been the case with heretofore known granular coated sheets. It efficiently removes the fleshy portions from the leather without digging into the fibers, resulting in a buffing action which presents a smooth finish on the surface.

This buffing action is further of particular importance in the finishing of aluminum. The sharp granular surfaces ordinarily used, together with the tendency of the aluminum to "drag", does not permit of successful polishing or finishing, whereas the action of granules coated with metal or the like is particularly efficacious and give to the aluminum surface an exceedingly smooth finish.

In the grinding of soft woods, it is found that granular coated webs of the character described above will last much longer than other types for the reason that particles or cuttings from the abraded material can not fill the spaces between the granules and retard the cutting action due to filling.

It is not intended that the scope of my invention shall be limited, but shall be commensurate with the spirit of the appended claim.

I claim:

1. A new article of manufacture comprising a web coated with granular material and a metal foil superimposed and adhesively attached to said granular surface.

2. A new article of manufacture comprising a web coated with granular material and a metal foil superimposed and adhesively attached to said granular surface, said coating of metal foil being continuous and of uniform thickness.

CHARLES E. WOODDELL.